United States Patent [19]

Nakamura et al.

[11] 3,914,736

[45] Oct. 21, 1975

[54] DUAL BRAKE SYSTEM FAULT DETECTION DEVICE

[75] Inventors: Hiroyuki Nakamura, Toyoda; Hiroshi Kawaguchi; Kiyoshi Nishiwaki, both of Susono, all of Japan

[73] Assignee: Toyota Jidosha Kogyo Kabushiki Kaisha, Japan

[22] Filed: Apr. 19, 1974

[21] Appl. No.: 462,528

[30] Foreign Application Priority Data

June 29, 1973 Japan.................. 48-72854

[52] U.S. Cl............. 340/52 C; 303/6 C; 188/151 A
[51] Int. Cl.².......................... B60T 17/22
[58] Field of Search......... 340/52 C; 303/6 C, 84 A; 188/151 A; 137/87

[56] References Cited
UNITED STATES PATENTS

| 3,672,728 | 6/1972 | Keady et al.............. 303/6 C |
|---|---|---|
| 3,698,771 | 10/1972 | Keady........................ 303/6 C |

*Primary Examiner*—Alvin H. Waring
*Attorney, Agent, or Firm*—Toren, McGeady and Stanger

[57] ABSTRACT

A fault detection device for a dual brake system comprises means for sensing a pressure imbalance in the system whereby a signal may be generated indicating the occurrence of a fault in the system. The sensing means may be provided in juxtaposition with a regulating valve in a rear brake circuit for sensing the rear master cylinder oil pressure and rear wheel cylinder oil pressure in said circuit or it may be disposed on the master cylinder side between the rear brake circuit and front brake circuit to sense the master cylinder oil pressures in the two circuits. When a pressure imbalance indicating trouble arises in the brake system, switch means responsive to the sensing means is operated due to the imbalance to light a warning lamp.

4 Claims, 4 Drawing Figures

3,914,736

DUAL BRAKE SYSTEM FAULT DETECTION DEVICE

BACKGROUND OF THE INVENTION

The present invention relates to a device for sensing a fault in a hydraulic service brake system for vehicles such as automobiles, and particularly to a device for use in a dual brake system in which two brake systems, one for the front wheels and the other for the rear wheels, are provided operatively independent of each other.

A necessity has arisen for obtaining a highly reliable and secure braking system to cope with higher automobile speeds and aggravated traffic conditions occurring in recent years, and in order to meet such requirements, there have been developed and practically utilized so-called dual brake systems in which the hydraulic service brake system is divided into a front brake system for front wheels and a rear brake system for rear wheels, both said brake systems being arranged operatively independent of each other so that should oil leakage occur in a part of the hydraulic circuit, it is possible to prevent all of the wheel brakes from becoming inoperative at the same time.

In such dual brake systems, there is employed an arrangement for distributing the braking force utilizing a regulating valve so as to maintain stability of the vehicle when it is braked, whereby a means is provided for increasing the braking force of the rear brake system by a by-pass valve when the front brake system breaks down or becomes inoperative. However, breakdown or other abnormality of the valves themselves usually remains unnoticed when the vehicle is at a standstill. Such breakdowns are discovered for the first time when the moving vehicle is braked, becoming apparent only because of the abnormal braking effect which occurs. Discovering trouble at such time is usually too late, and accordingly serious accidents will sometimes result.

In view of the above, the present invention has for its object to provide a device which enables discovery of trouble in any part of the brake system, including the regulating valve and by-pass valve, even when the vehicle is at a standstill. The invention operates by sensing pressure imbalance in the system, which occurs as the result of a fault, and by triggering a warning device to indicate the fault.

SUMMARY OF THE INVENTION

The present invention may be briefly described as a fault detection device for a dual brake system including front and rear master cylinders and front and rear wheel cylinders, with brake actuating means, such as a brake foot pedal, operating to apply braking fluid pressure developed in the master cylinders to the wheel cylinders to brake a vehicle. The system includes a regulating valve which permits fluid pressure in the front and rear wheel cylinders to rise linearly relative to the fluid pressure in the master cylinders until a particular predetermined pressure level is reached. At such point, the development of fluid pressure in the rear wheel cylinder occurs at a rate which is less than linear taken relative to the rear master cylinder pressure. The device of the present invention comprises sensing means which are connected in the braking system to sense an imbalance in fluid pressure thereby to activate a signal device responsive to the sensing means which produces a signal upon occurrence of the sensed pressure imbalance to indicate a fault in the braking system.

In one aspect of the invention, the sensing means is connected to sense a pressure imbalance between the rear master cylinder and the rear wheel cylinders. In another embodiment, the sensing means is connected to sense pressure imbalance between the braking circuit for the front wheels and the braking circuit for the rear wheels.

In view of the fact that the pressure in the rear wheel cylinder rises linearly relative to the rear master cylinder, and subsequently at a lesser rate when a predetermined pressure level is reached, the sensing means are designed to compensate for this occurrence.

The pressure imbalance sensing means of the present invention are configured with a stepped fluid pressure cylinder having a small diameter end and a large diameter end with a fluid pressure chamber being defined at each of said ends of the cylinder. A stepped piston is movably mounted within the cylinder and is arranged to slide in response to pressure imbalances between the fluid pressure chambers. Spring means are provided for resisting movement of the piston until a predetermined level of pressure imbalance occurs. The signal means of the invention comprise switch means which are activated as a result of movement of the piston to indicate a fault in the system.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE PREFERRED EMBODIMENTS

Figure 1:
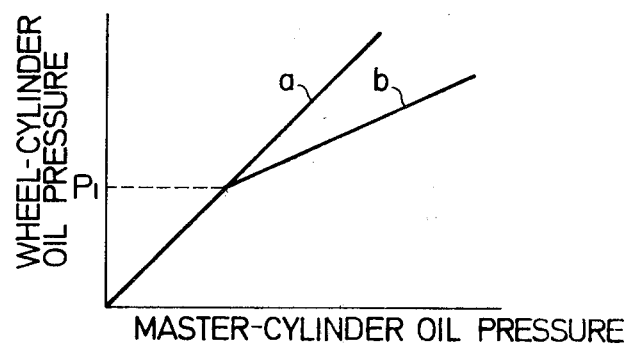
FIG. 1 is a graphic diagram showing the relationship between wheel cylinder oil pressure and master cylinder oil pressure.

FIG. 1 shows the relationship between master cylinder oil pressure and wheel cylinder oil pressure. In the front brake system, the wheel cylinder oil pressure increases linearly, or in a ratio of 1 : 1, with the master cylinder oil pressure as indicated by straight line $a$. However, in the rear brake system, the wheel cylinder oil pressure, although rising at a rate of 1 : 1 with master cylinder oil pressure to a half-way point, begins to rise at a decelerated rate as the result of a regulating valve, which operates to change the relationship to that indicated by curve $b$. Thus, it will be seen from FIG. 1 that although brake pressure in both the rear and front wheel cylinders increases linearly relative to master cylinder pressure during the initial phase of the curve, once a pressure level $P_1$ is reached, rear wheel cylinder pressure begins to rise at a reduced rate relative to rear master cylinder pressure. Thus, when the braking force is increased, such force is distributed such that the rear braking force will become smaller than the front braking force.

A dual brake system which performs such brake oil pressure control is described with reference to FIG. 2. it will be seen that a front master cylinder 2 and a rear master cylinder 3 are connected in tandem to a brake pedal 1 so that an equal amount of oil pressure will be produced in both cylinders according to the force applied to the brake pedal. The front master cylinder 2 is connected through a conduit 4, a valve assembly 10 and a conduit 5 to front wheel cylinders 6, 6' so that a front brake oil pressure may be supplied thereto, while the rear master cylinder 3 is similarly connected through a conduit 7, a valve assembly 10 and conduit 8 to rear wheel cylinders 9, 9' so that a rear brake oil pressure may be supplied thereto. The valve assembly 10 comprises a regulating valve 20 provided between a passage 11 connected to conduit 7 on the rear master cylinder side and a passage 12 connected to conduit 8 on the rear wheel cylinder side, and a by-pass valve 30 provided between a by-pass passage 13 branching off from the passage 11 and the passage 12.

On the operating side of the by-pass valve 30 there is provided a hydraulic chamber 14 which is connected to the conduit 4 through a passage 15 and to the conduit 5 through a passage 16, respectively. The regulating valve 20 consists of a cylinder 21 provided between and in communication with the passages 11 and 12, with a valve seat 22 being provided in said cylinder 21 on its side closer to the passage 12. A piston 24 is movably inserted into the cylinder 21, with a spring 23 being loaded on one side of the piston, and with a valve body 26 being mounted on said piston 24 and adapted to change the open area of an opening 25 in the valve seat 22, whereby the rate of rise of the wheel cylinder oil pressure is varied.

The by-pass valve 30 consists of a cylinder 31 provided between and in communication with the passages 12, 13 and hydraulic chamber 14, a piston 33 movably inserted into the cylinder 31, with a spring 32 being loaded on one side thereof, a recess 34 formed at a location in the piston 33 corresponding to the passage 12 so as to allow passage of the rear brake oil pressure, and a valve body 36 mounted at an end of the piston 33 with a seal packing 35 so as to open or close the by-pass passage 13. The valve 30 operates to communicate the by-pass passage 13 with the passage 12 when the front wheel cylinder oil pressure in the hydraulic chamber 14 fails to rise to the regulated level.

In the normal braking operations, master cylinder oil pressure from the rear master cylinder 3 is supplied through the conduit 7, passage 11, regulating valve 20, passage 12 and conduit 8 to the rear wheel cylinders 9, 9', and if wheel cylinder oil pressure is low, the piston 24 is moved to the right by the force of the spring 23 in the valve 20, causing the valve body 26 to fully open the opening 25 in the valve seat 22 so that the wheel cylinder oil pressure rises at an equal rate with the master cylinder oil pressure. However, when the wheel cylinder oil pressure reaches a value indicated by $P_1$ in FIG. 1, the piston 24 is now urged to move to the left by the force of wheel cylinder oil pressure working upon said piston 24, thus diminishing the open area of the opening 25, so that, after this occurrence, the rate of rise of wheel cylinder oil pressure relative to master cylinder oil pressure decreases.

In the front brake system, master cylinder oil pressure from the front master cylinder 2 is likewise supplied to the front wheel cylinders 6, 6' through conduit 4, passage 15, hydraulic chamber 14, passage 16 and conduit 5, with the wheel cylinder oil pressure being increased at an equal rate with the rate of increase in master cylinder oil pressure. During this period, the piston 33 in the by-pass valve 30 is moved to the left by the front brake oil pressure and the force of spring 32, with the by-pass passage 13 remaining closed by the valve body 36. If, however, trouble arises in the front brake system to impede normal rise of wheel cylinder oil pressure, the piston 33 in the by-pass valve 30 is forced to move to the right with the valve body 36 by the rear master cylinder oil pressure in the by-pass passage 13, thus admitting such oil pressure directly into the passage 12, whereby the rear wheel cylinder oil pressure is elevated to the same level without being controlled by the regulating valve 20.

Figure 2:
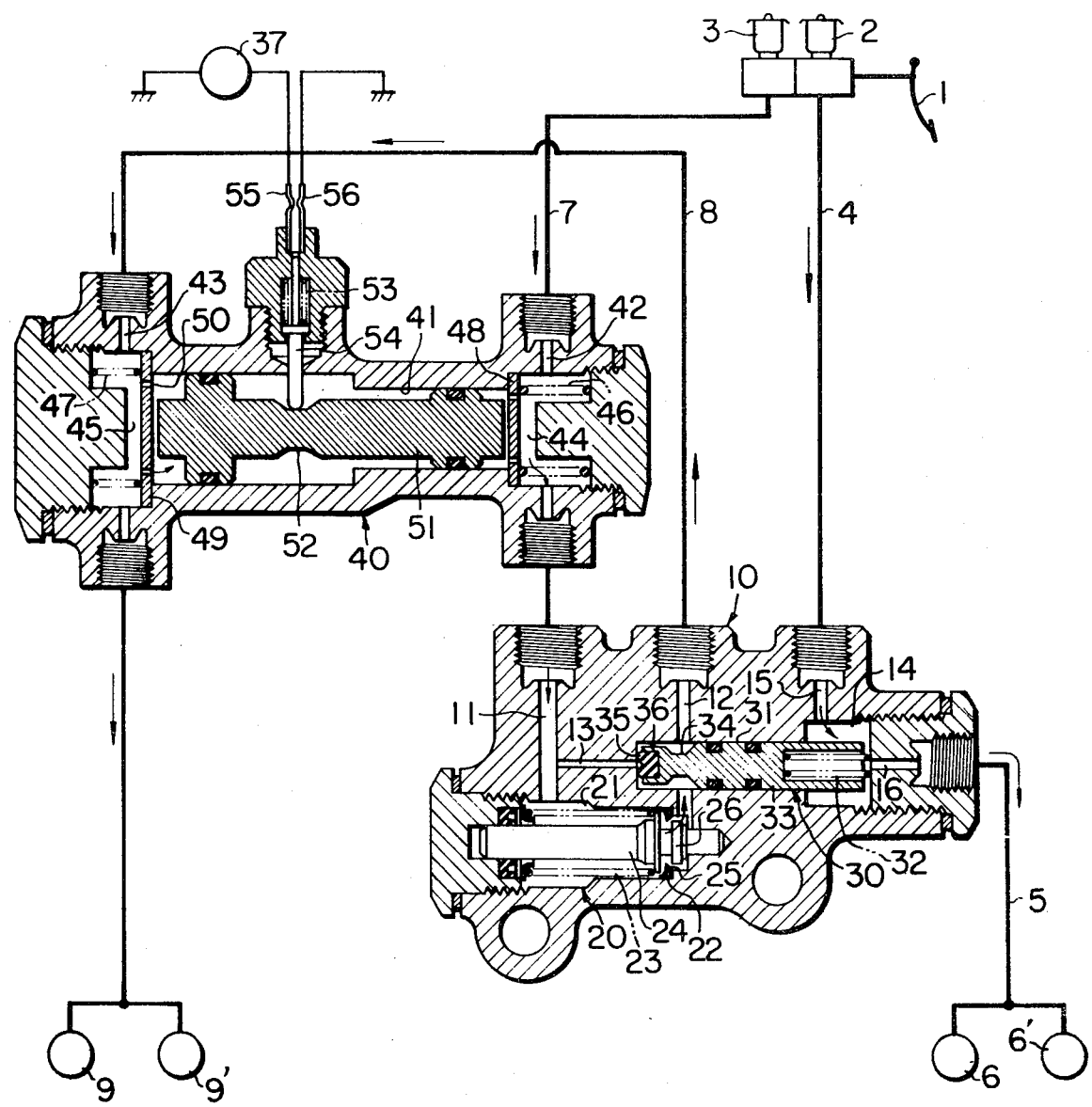
FIG. 2 is a schematic diagram showing an embodiment of the present invention as incorporated in a dual brake system, with certain elements shown in section.

A fault sensing device featuring the present invention is incorporated in the dual brake system, and a preferred embodiment of an actual adaptation of the device utilized in the brake system is illustrated in FIG. 2. It will be seen that a sensing device 40 is provided in a parallel connection with the regulating valve 20 between the conduits 7 and 8 of the rear brake system, with said sensing device 40 being electrically connected to a power source via a warning lamp 37. The sensing device 40 comprises a stepped cylinder 41, passages 42 and 43 connected with the conduits 7 and 8, respectively, hydraulic chambers 44, 45 formed respectively between said passages 42 or 43 and the small-diameter side or the large-diameter side of the stepped cylinder 41, stopper plates 48, 49 provided respectively between said stepped cylinder 41 and said hydraulic chambers 44 or 45, with a spring 46 or 47 being loaded on one side of each of said stopper plates so that the latter is movable rearwardly. Holes 50 are provided in the stopper plates 48, 49 for allowing passage of oil pressure therethrough, and a stepped piston 51 is movably inserted in the stepped cylinder 41 in engagement with the small-diameter portion and large-diameter portion thereof, with a dovetailed recess 52 being formed at a middle part of said stepped piston 51. An electroconductive rod 54 is loaded on one side thereof with a spring 53 so as to be movable into or out of said recess 52 in accordance with movement of the stepped piston 51, and contacts 55, 56 are arranged to be connected with or separated from each other in accordance with movement of said rod 54.

Thus, when brakes are applied, master cylinder oil pressure in the conduit 7 is supplied into the chamber 44 so that said oil pressure acts to the small-diameter end of the stepped piston 51 while wheel cylinder oil pressure in the conduit 8 is supplied into the chamber 45 so that oil pressure acts to the large-diameter end of the piston 51 in a manner opposing the action of the master cylinder oil pressure. Therefore, if rear brake oil pressure is small below a predetermined range, and wheel cylinder oil pressure rises at the equal rate with master cylinder oil pressure, the stepped piston 51 is forced to move to the right owing to the area differences in the piston. However, the spring 46 which is designed with a large setting load causes the piston 51 to move back slightly to contact with the stopper plate 48, whereby the rod 54 moves to its lowered position in engagement with the recess 52, bringing the contacts 55, 56 out of contact or into the open or separated position.

As the wheel cylinder oil pressure rises further and the acting force of the stepped piston 51 is increased, the by-pass passage 13 is shut by the by-pass valve 30, allowing the regulating valve 20 to perform its normal oil pressure adjusting activity. When this stage is reached, the rate of rise of wheel cylinder oil pressure declines as compared with that of master cylinder oil pressure, so that, after this moment, the stepped piston 51 maintains the above-described condition owing to the balancing of the acting forces of both oil pressures, keeping the contacts 55 and 56 separated and hence preventing the lamp 37 from being lighted. It will be noted that the spring forces created in the sensing device 40 are designed to compensate for the area differences in the piston 51 in view of the master and wheel cylinder pressures which are applied thereto.

However, if a fault occurs in the regulating valve 20 or in the seal of the valve body 36, wheel cylinder oil pressure will not be adjusted but will be caused to rise at the same rate as master cylinder oil pressure, so that the stepped piston 51 overcomes the setting load of the spring 46 and moves to the right. Also, if the regulating valve 20 breaks down and no wheel cylinder oil pressure is produced in spite of a continuing increase of master cylinder oil pressure, the stepped piston 51 overcomes the setting load of the spring 47 by the action of master cylinder oil pressure and begins to move to the left. In either case, the rod 54 moves upwardly away from the recess 52, so that the contacts 55 and 56 are connected to light the warning lamp 37, thus letting an operator know that trouble exists.

Figure 3:
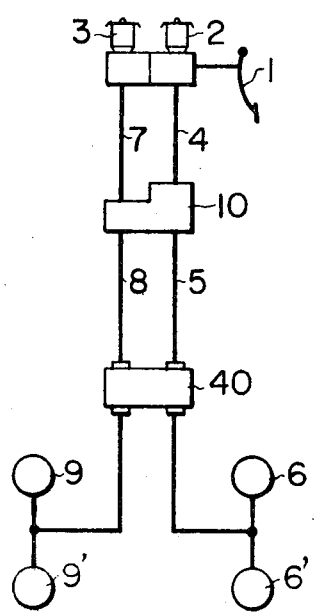
FIG. 3 is a diagram schematically showing another embodiment of the present invention.

Referring now to FIG. 3, there is shown another embodiment of the present invention wherein the passage 42 leading into the small-diameter side hydraulic chamber 44 in the sensing device 40 is connected to the conduit 5 of the front brake system. According to this arrangement, trouble in the regulating valve 20 and by-pass valve 30 as well as in the front and rear brake systems can be detected. That is, if a fault develops in the front brake system to hamper normal rise of front brake oil pressure, the stepped piston 51 is caused to move to the right, and if the rear brake system fails and rear brake oil pressure does not rise normally, the piston 51 is then forced to move to the left, thus producing the same fault sensing effect as described above.

Figure 4:
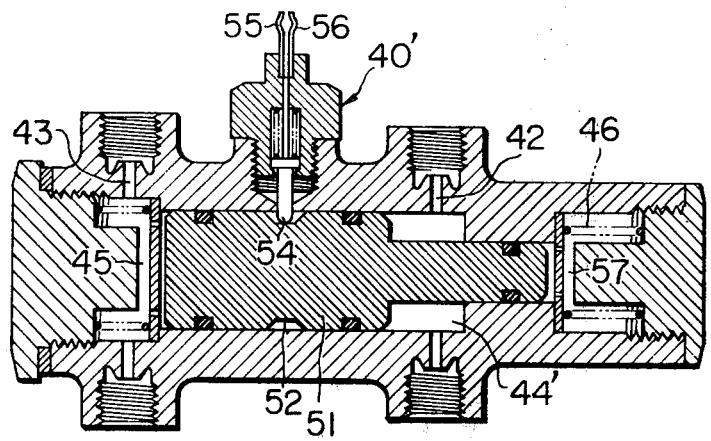
FIG. 4 is a sectional view showing another embodiment of the sensing means according to the present invention.

In FIG. 4 there is shown another example of the sensing device 40 wherein a small-diameter side hydraulic chamber 44' communicated with the passage 42 is provided separate from the chamber 57 with the spring 46 being formed around the small-diameter portion of the stepped piston 51 so that oil pressure in the chamber 44' will act as a result of the area difference between the large-diameter portion and the small-diameter portion of the stepped piston 51.

As will be apparent from the foregoing description, if the device of the present invention is adapted in a vehicle such as an automobile, one can readily discover failure or trouble such as oil leakage in the regulating valve 20 and by-pass valve 30 in the dual brake system or in either of the independent front and rear brake systems, by merely stepping down upon the brake pedal to produce the brake oil pressure with the vehicle at a standstill. Any pressure imbalance in the sensed pressures arising as a result of a fault in the system will operate to flash a warning signal thus indicating that the vehicle is unsafe to operate. Therefore it will be seen that the device of the present invention provides a measure of great significance in terms of the safety of vehicle operation.

While specific embodiments of the invention have been shown and described in detail to illustrate the application of the inventive principles, it will be understood that the invention may be embodied otherwise without departing from such principles.

What is claimed is:

1. A fault detection device for a vehicle dual brake system including brake actuating means, a front brake circuit including a front master cylinder and front wheel cylinders, a rear brake circuit including a rear master cylinder and rear wheel cylinder, conduit means operatively connecting said master cylinders to apply braking fluid pressure to said wheel cylinders to brake said vehicle in response to operation of said actuating means, and regulating valve means reducing in said rear wheel cylinders the rate of rise of braking fluid pressure therein after said pressure has exceeded a predetermined level, said fault detection device comprising means for sensing a predetermined level of pressure imbalance between said rear master cylinder and said rear wheel cylinders, and signal means responsive to said sensing means for generating a signal upon occurrence of said pressure imbalance to indicate a fault in said system.

2. A device according to claim 1 wherein said sensing means comprise a stepped cylinder having a small diameter end and a large diameter end, means defining a fluid pressure chamber at each of said ends of said cylinder, a stepped piston movably mounted in said stepped cylinder for movement therein in response to pressure imbalances between said fluid pressure chambers, and spring means for resisting movement of said piston for pressure imbalances below a predetermined level occurring during normal braking operation of said system, and wherein said signal means comprise switch means responsive to movement of said stepped piston to generate a signal upon movement of said piston occurring as a result of a predetermined level of pressure imbalance in said pressure chambers to thereby indicate the occurrence of a fault in said braking system.

3. A device according to claim 2 wherein said oil pressure chamber on said large diameter end of said cylinder is connected with said rear wheel cylinders and wherein said oil pressure chamber on said small diameter and of said cylinder is connected with said rear master cylinder.

4. A device according to claim 2 wherein said oil pressure chamber on said larger diameter end of said cylinder is connected with said rear brake circuit and wherein said oil pressure chamber on said small diameter end of said cylinder is connected with said front brake circuit.

* * * * *